(12) United States Patent
Lin et al.

(10) Patent No.: US 11,372,115 B2
(45) Date of Patent: Jun. 28, 2022

(54) VEHICLE LOCALIZATION (71) Applicant: CYNGN, INC., Menlo Park, CA (US)

(72) Inventors: I-Chung Joseph Lin, Saratoga, CA (US); Elena Ramona Stefanescu, Sunnyvale, CA (US); Dhivya Sukumar, Mountain View, CA (US); Sumit Saxena, Santa Clara, CA (US)

(73) Assignee: CYNGN, INC., Menlo Park, CA (US)

( * ) Notice: Subject to any disclaimer, the term of this patent is extended or adjusted under 35 U.S.C. 154(b) by 85 days.

(21) Appl. No.: 16/422,640

(22) Filed: May 24, 2019

(65) Prior Publication Data
US 2020/0150280 A1    May 14, 2020

Related U.S. Application Data (60) Provisional application No. 62/676,035, filed on May 24, 2018.

(51) Int. Cl.
*G01S 19/00* (2010.01)
*G01S 19/47* (2010.01)
(Continued)

(52) U.S. Cl.
CPC ............ *G01S 19/47* (2013.01); *G01S 19/393* (2019.08); *G05D 1/027* (2013.01); *G05D 1/0253* (2013.01);
(Continued)

(58) Field of Classification Search
CPC ..... G01S 19/47; G01S 19/393; G05D 1/0253; G05D 1/0278; G05D 1/0272; G05D 1/027; G01C 21/1656
See application file for complete search history.

(56) References Cited

U.S. PATENT DOCUMENTS 8,666,661 B2 * 3/2014 Higgins ............... G06T 7/246
701/495
9,031,782 B1 * 5/2015 Lemay .................. G06T 7/73
701/445

(Continued)

OTHER PUBLICATIONS

Wei, L et al. Intelligent Vehicle Localization in Urban Environments Using EKF-based Visual Odometry. IFAC Proceedings, vol. 44, Issue 1, Jan. 2011, pp. 13776-13781 [online], [retrieved on Dec. 31, 2020], Retrieved from the Internet <URL: http://www.sciencedirect.com/science/article/pii/S1474667016458386> (Year: 2011).*

(Continued)

*Primary Examiner* — Peter D Nolan
*Assistant Examiner* — Peter Y Ning
(74) *Attorney, Agent, or Firm* — Maschoff Brennan (57) ABSTRACT The localization of a vehicle is determined using less expensive and computationally robust equipment compared to conventional methods. Localization is determined by estimating the position of a vehicle relative to a map of the environment, and the process thereof includes using a map of the surrounding environment of the vehicle, a model of the motion of the frame of reference of the vehicle (e.g., ego-motion), sensor data from the surrounding environment, and a process to match sensory data to the map. Localization also includes a process to estimate the position based on the sensor data, the motion of the frame of reference of the vehicle, and/or the map. Such methods and systems enable the use of less expensive components while achieving useful results for a variety of applications, such as autonomous vehicles.

20 Claims, 2 Drawing Sheets (51) Int. Cl.
*G01S 19/39* (2010.01)
*G05D 1/02* (2020.01)
(52) U.S. Cl.
CPC ......... *G05D 1/0272* (2013.01); *G05D 1/0278* (2013.01); *G05D 2201/0213* (2013.01)

(56) References Cited

U.S. PATENT DOCUMENTS

| | | | | |
|---|---|---|---|---|
| 9,483,816 | B2* | 11/2016 | Smith | G06T 7/00 |
| 9,870,624 | B1* | 1/2018 | Narang | G06T 7/74 |
| 10,395,117 | B1* | 8/2019 | Zhang | G06V 20/58 |
| 10,437,252 | B1* | 10/2019 | Liu | G05D 1/0212 |
| 11,037,320 | B1* | 6/2021 | Ebrahimi Afrouzi | G06T 7/60 |
| 2010/0250133 | A1* | 9/2010 | Buros | G01S 19/48 |
| | | | | 701/472 |
| 2016/0273921 | A1* | 9/2016 | Zhou | G01C 21/165 |
| 2017/0301111 | A1* | 10/2017 | Zhao | G01C 25/005 |
| 2019/0220002 | A1* | 7/2019 | Huang | G06F 1/163 |
| 2019/0258251 | A1* | 8/2019 | Ditty | G06V 20/58 |
| 2020/0334841 | A1* | 10/2020 | Cristobal | G06T 7/74 |

OTHER PUBLICATIONS

Wei, L et al. Intelligent Vehicle Localization in Urban Environments Using EKF-based Visual Odometry. IFAC Proceedings, vol. 44, Issue 1, Jan. 2011, p. 13776-13781 [online], [retrieved on 2020-12-31], Retrieved from the Internet <URL http://www.sciencedirect.com/science/article/pii/S1474667016458386> (Year: 2011).*

* cited by examiner

VEHICLE LOCALIZATION

BACKGROUND

1. The Field of the Disclosure

The present disclosure relates to localization of a vehicle.

2. The Relevant Technology

The present disclosure relates to localization of a vehicle. For example, the present disclosure may facilitate one or more operations via which an autonomous vehicle (AV) may identify the location and orientation of the AV.

The subject matter claimed herein is not limited to embodiments that solve any disadvantages or that operate only in environments such as those described above. Rather, this section is only provided to illustrate one exemplary technology area where some embodiments described herein may be practiced.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DETAILED DESCRIPTION

The present disclosure may relate to localization of a vehicle. The term localization may refer to the estimation of a position of a vehicle relative to a map of the environment. The process of localization may include the concepts of utilizing a map of the surrounding environment of the vehicle; a model of the motion of the frame of reference of the vehicle (e.g., ego-motion); sensor data from the surrounding environment; a process to match sensory data to the map; and a process to estimate the position based on the sensor data, the motion of the frame of reference of the vehicle, and/or the map. In these and other embodiments, the present disclosure may include the use of less expensive components working together in a unique way such that desirable results may be achieved using significantly less expensive equipment.

Figure 1:
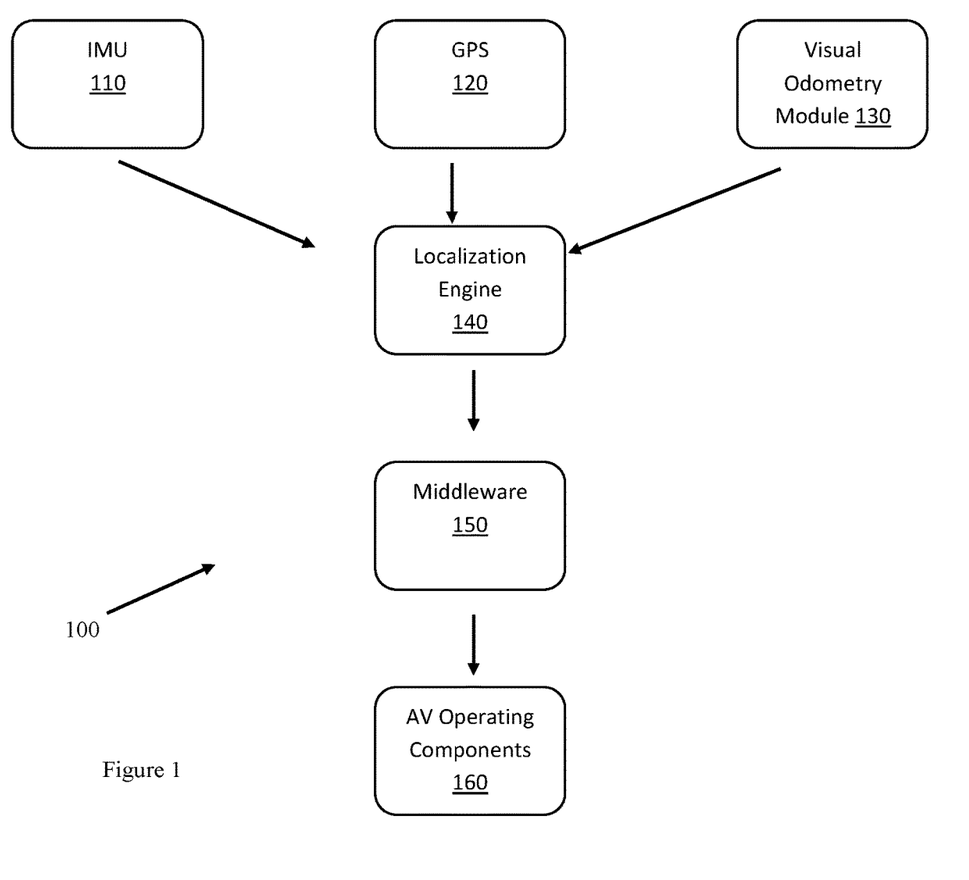
FIG. 1 illustrates an example environment for vehicle localization.

FIG. 1 illustrates an example environment 100 for vehicle localization. The environment 100 may include an inertial measurement unit (IMU) 110, a global positioning system (GPS) unit 120, and a visual odometry module 130. The data from each of the IMU 110, the GPS unit 120, and/or the visual odometry module 130 may be used as input by an localization engine 140. The localization engine 140 may utilize such data to determine a position of a vehicle relative to a map of an environment. The localization engine 140 may provide data to middleware 150 to interact with the AV operating components 160. For example, based on the position as determined from data from the IMU 110, the GPS unit 120, and/or the visual odometry module 130, the middleware may direct the AV operating components 160 to steer left or right, accelerate, decelerate, brake, turn, stop, etc. In some embodiments a map may also be used by the AV to determine in what manner it should operate. For example, with a known position and an underlying map, the localization engine 140 may direct the AV to begin turning such that the AV may follow directions or otherwise navigate along a road as designated by the map.

In some embodiments, the visual odometry module 130 may include one or more image capturing devices, such as cameras, optical sensors, or other devices with imaging capabilities. In these and other embodiments, the image capturing devices may capture one or more images for analysis. For example, the image capturing devices may capture a series of images for use in performing the localization. Such images may include a stream of successive gray scale images from a single camera. Additionally or alternatively, the images may include gray scale images from two or more cameras, such as stereoscopic images. In these and other embodiments, the images may be color images. However, as described above, the use of gray scale cameras rather than color cameras may provide for less expensive equipment in image acquisition and in localization processing. In these and other embodiments, the images for localization may be passed to the localization engine 140 to perform the localization processing to determine the position of the vehicle.

In some embodiments, a rotation matrix and/or a translation vector may be determined based on two successive images. Any processing technique may be used to derive such matrices and vectors. For example, feature identification may be performed on one or more features in the images such that the difference in location of the features between the two images may be determined and used to determine the change in location and/or rotation of the frame of reference (e.g., the ego-motion of the camera). The features identified may include any identifiable aspect of the image, including known landmarks, street signs, buildings, gutters, etc.

In some embodiments, the IMU 110 may include one or more sensors to determine mechanical properties of the motion of the AV. For example, the IMU 110 may include one or more gyroscopes, accelerometers, magnetometers, etc. In these and other embodiments, the IMU 110 may be configured to determine an angular rate and/or a longitudinal acceleration of the AV. In these and other embodiments, the angular rates and longitudinal accelerations in each of a variety of degrees of freedom may be provided to the localization engine 140 to perform the localization. In some embodiments, such degrees of freedom may operate according to a planar model, such that there are three degrees of freedom with location/motion in the two directions of the plane and one degree of freedom representing orientation of the AV. Additionally or alternatively, such degrees of freedom may operate according to a three-dimensional model, such that there are six degrees of freedom with three degrees of freedom for location in the three-dimensional space (e.g., x, y, z) and orientation within the three dimensional space (e.g., roll, pitch, yaw). In some embodiments, the planar model may be used for AVs to be used in a known circumstance that is relatively flat, such that the planar model is appropriate and lower cost components may be used and processing may be simplified. Additionally or alternatively, for circumstances when there may be significant amounts of change in the vertical direction, the three-dimensional model may be used.

In some embodiments, the GPS unit 120 may obtain data indicative of the location of the AV. For example, the GPS unit 120 may obtain a latitude and a longitude of the AV. In these and other embodiments, the GPS unit 120 may operate in accordance with typical GPS components. In these and other embodiments, the GPS unit 120 may provide accuracy of the latitude and longitude to within approximately 5 meters or 10 meters.

In some embodiments, a more complex GPS technology may be used, such as a corrective version of GPS such as Differential GPS (DGPS) or Real Time Kinematic (RTK), whether applied to GPS specifically or operating independently. In these and other embodiments, the accuracy of the GPS unit 120 may be improved as compared to typical GPS position determination. However, such GPS systems with additional complexity may come at an increased cost. In these and other embodiments, whether the GPS unit 120 utilizes a more complex or a less complex technology, the GPS unit 120 may pass the latitude and longitude information to the localization engine 140.

In these and other embodiments, the localization engine 140 may utilize the inputs of the images from the visual odometry module 130, the angular rates and longitudinal accelerations from the IMU 110, and the latitude and longitude information from the GPS unit 120. Using such inputs, for each pair of images, the localization engine 140 may output the rotation matrix R and the translation vector t. Such information may be integrated with the latitude and longitude information, and the angular rate and longitudinal acceleration information, to derive the position of the AV.

In some embodiments, the rotation matrix R and the translation vector t may be used to facilitate determination of a heading of the vehicle. Additionally or alternatively, the rotation matrix R and the translation vector t may be used to determine relative locations for the AV between two points in time.

In some embodiments, the localization engine 140 may utilize an extended Kalman filter (EKF) processing technique to facilitate determination of the position of the AV. The EKF processing may allow the use of differentiable functions for the state transition and observation models. In these and other embodiments, the general equations for the EKF may include, in the prediction phase:

$$\hat{x}_{\bar{k}} = g(\hat{x}_{k-1}, u_k)$$

$$P_{\bar{k}} = A_k P_{k-1} A_k^T + W_k Q_k W_k^T$$

and in the update phase:

$$K_k = P_{\bar{k}} H_k^T (H_k P_{\bar{k}} H_k^T + V_k R_k V_k^T)^{-1}$$

$$\hat{x}_k = \hat{x}_{\bar{k}} + K_k(z_k - (\hat{x}_{\bar{k}}))$$

$$P_k = (I - K_k H_k) P_{\bar{k}}$$

where $\hat{x}_k$ may represent an estimated state, $\hat{x}_{\bar{k}}$ may represent the current state prediction, g and h may represent non-linear measurement functions, $u_k$ may represent a control function, P may represent a state variance matrix (e.g., an error of estimation), Q may represent a process variance matrix (e.g., an error due to process), z may represent measurement variables, K may represent Kalman gain, R may represent a measurement variance matrix (e.g., error related to taking measurements), A may represent the Jacobian matrix of partial derivatives of g with respect to x, w may represent the state noise, W may represent the Jacobian matrix of partial derivatives of g with respect to w, H may represent the Jacobian matrix of partial derivatives of h with respect to x, v may represent the observation noise, and V may represent the Jacobian matrix of partial derivatives of h with respect to v. The subscript k is used to designate a current time period, and k−1 is used to designate a previous time period.

Using the above-equations, a matrix of partial derivatives (the Jacobian matrix) may be computed for each time step. Using these in the above-equations may effectively linearize the non-linear function around the current estimate (e.g., around $x_k$).

Using the above-equations, a state vector may be estimated. The state vector $x_k$ at time k may include:

$$x_k = \begin{pmatrix} x \\ y \\ \psi \\ v \\ \dot{\psi} \\ a \end{pmatrix} = \begin{pmatrix} \text{latitude} \\ \text{longitude} \\ \text{yaw or heading} \\ \text{velocity} \\ \text{yaw rate} \\ \text{longitudinal acceleration} \end{pmatrix}$$

where the variables correspond to the variables outlined above and identified in the equation.

Additionally, the localization processing matrix may be described by:

$$g_k = \begin{pmatrix} x + \frac{v}{\dot{\psi}}(-\sin(\psi) + \sin(dk\dot{\psi} + \psi)) \\ y + \frac{v}{\dot{\psi}}(\cos(\psi) - \cos(dk\dot{\psi} + \psi)) \\ dk\dot{\psi} + \psi \\ dka + v \\ \dot{\psi} \\ a \end{pmatrix}$$

where dk may represent a change in time between two consecutive poses or images. The Jacobian of the localization processing matrix $J_A$ may be defined as:

$$J_A = \begin{bmatrix} 1.0 & 0.0 & h_{13} & h_{14} & h_{15} \\ 0.0 & 1.0 & h_{23} & h_{24} & h_{25} \\ 0.0 & 0.0 & 1.0 & 0.0 & dk \\ 0.0 & 0.0 & 0.0 & 1.0 & 0.0 \\ 0.0 & 0.0 & 0.0 & 0.0 & 1.0 \end{bmatrix}$$

where:

$$h_{13} = \frac{v}{\phi}$$

$$h_{14} = \frac{1}{\phi}(-\sin(\phi) + \sin(dk * \phi + \phi))$$

$$h_{15} = \frac{dk * v}{\phi}(\cos(dk * \phi + \phi) - \frac{v}{\phi^2}(\sin(dk * \phi + \phi))$$

$$h_{23} = \frac{v}{\phi}(\sin(dk * \phi + \phi) - \sin(\phi))$$

$$h_{24} = \frac{1}{\phi} * (-\cos(dk * \phi + \phi) + \cos(\phi))$$

$$h_{25} = \frac{dk * v}{\phi} * \sin(dk * \phi + \phi) - \frac{v}{\phi^2}(-\cos(dk * \phi + \phi))$$

In some embodiments, the current state as determined by IMU 110 and the GPS 120 data may be integrated with the current state as determined by the visual odometry module 130. In these and other embodiments differences between the two current states may be resolved to arrive at a consistent and accurate final current state. In these and other embodiments, differences may be resolved by comparing data sources and predicted reliabilities for the different data sources for predicting the final current state. In these and other embodiments, one or more parameters of the estimation (e.g., one or more variables used in the EKF and/or used by the visual odometry module 130) may be modified or improved based on the determined final current state.

For example, if a GPS measurement is available the following function may map the state to the measurement:

$$h = \begin{bmatrix} x \\ y \\ v \\ \phi \end{bmatrix}$$

The matrix $J_H$ may be the Jacobian of the measurement function h with respect to the state. The function h may be used to compute the predicted measurement from the predicted state. If there are GPS measurements, the Jacobian $J_H$ may be:

$$J_H = \begin{bmatrix} 1 & 0 & 0 & 0 & 0 \\ 0 & 1 & 0 & 0 & 0 \\ 0 & 0 & 0 & 0 & 0 \\ 0 & 0 & 0 & 1 & 0 \\ 0 & 0 & 0 & 0 & 1 \end{bmatrix}$$

while if there are no GPS measurements, the Jacobian $J_H$ may be:

$$J_H = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 1 & 0 \\ 0 & 0 & 0 & 0 & 1 \end{bmatrix}$$

As described above, by using such an approach, the position of an AV may be determined using much less expensive equipment. For example, the sensors used may include a Point Grey Blackfly Mono 1.3 Megapixel camera with a USB connector, a microstrain IMU with a USB connector, and a Ublox® GPS receiver.

In some embodiments, the localization engine 140 may be implemented via a computing system. Such as system may include any suitable system, apparatus, or device configured to perform the operations described in the present disclosure. The computing system may include a processor, a memory, a data storage, and a/or communication unit, which all may be communicatively coupled.

Generally, the processor may include any suitable special-purpose or general-purpose computer, computing entity, or processing device including various computer hardware or software modules and may be configured to execute instructions stored on any applicable computer-readable storage media. For example, the processor may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Additionally, the processor may include any number of processors distributed across any number of network or physical locations that are configured to perform individually or collectively any number of operations described in the present disclosure. In some embodiments, the processor may interpret and/or execute program instructions and/or process data stored in the memory, the data storage, or the memory and the data storage. In some embodiments, the processor may fetch program instructions from the data storage and load the program instructions into the memory.

After the program instructions are loaded into the memory, the processor may execute the program instructions, such as instructions to perform any of the operations of the present disclosure.

The memory and the data storage may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor. In some embodiments, the computing system may or may not include either of the memory and the data storage.

By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store desired program code in the form of computer-executable instructions or data structures and which may be accessed by a general-purpose or special-purpose computer. The non-transitory computer-readable medium may have stored therein executable code with instructions for the performance of operations. Combinations of the above may also be included within the scope of computer-readable storage media. Computer-executable instructions may include, for example, instructions and data configured to cause the processor to perform a certain operation or group of operations.

The communication unit may include any component, device, system, or combination thereof that is configured to transmit or receive information over a network. In some embodiments, the communication unit may communicate with other devices at other locations, the same location, or even other components within the same system. For example, the communication unit may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit may permit data to be exchanged with a network and/or any other devices or systems described in the present disclosure. For example, the communication unit may allow the computing system to communicate with other systems, such as computing devices and/or other networks, or even other AVs.

Figure 2:
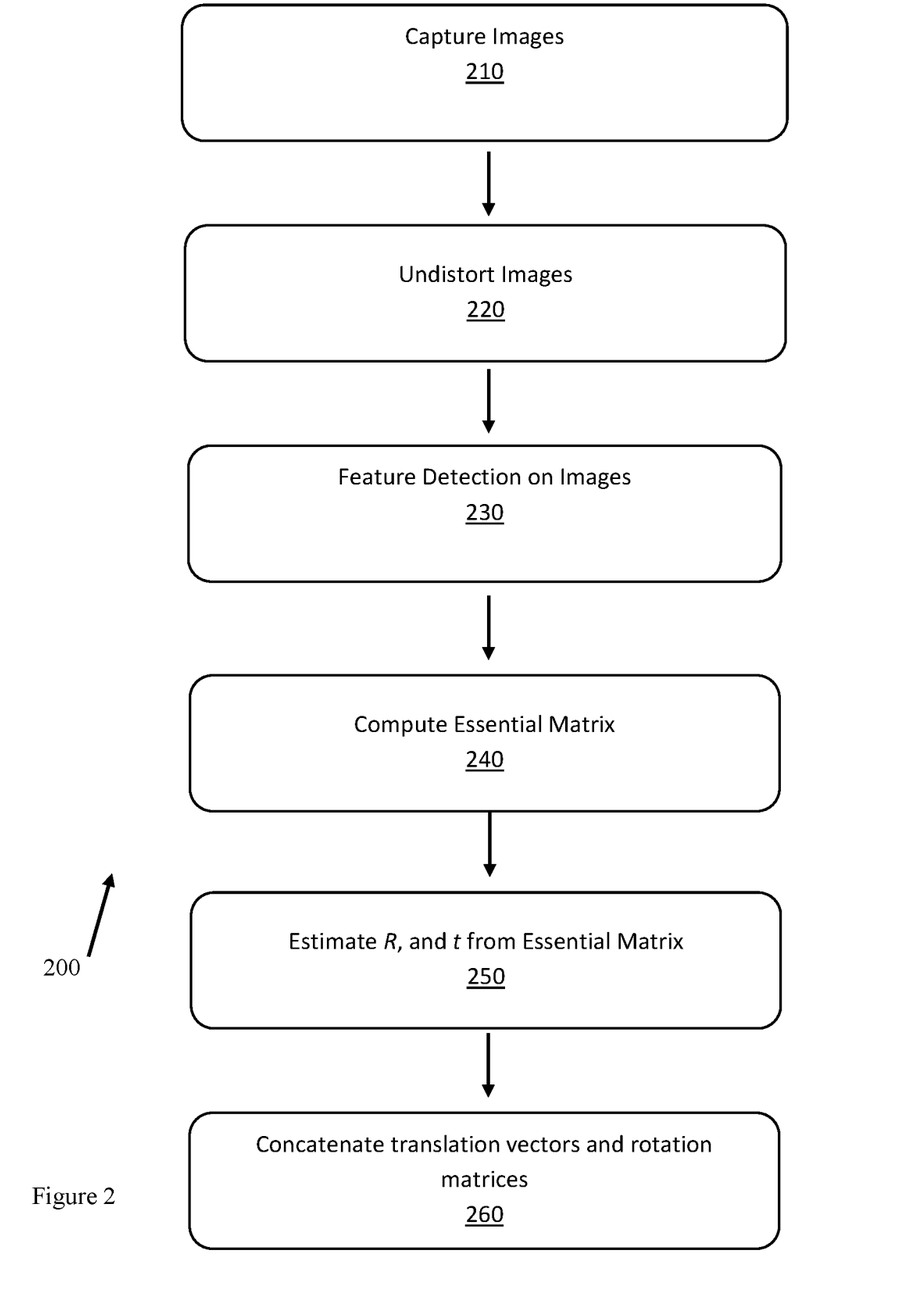
FIG. 2 illustrates a flow diagram of an example method of performing vehicle localization.

FIG. 2 illustrates a flow diagram of an example method 200 of performing vehicle localization, in accordance with one or more embodiments of the present disclosure.

At block 210, a pair of images may be captured. For example, a camera image associated with a vehicle may capture a first image at a first point in time and a second image at a second point in time (e.g., $I_t$ and $I_{t+1}$). In some embodiments, the pair of images may be adjacent images in a video, or may be capture at a frame rate similar to a video, such as ten frames per second. In some embodiments, the images may be black and white, gray scale, or color.

At block 220, the images may be undistorted. For example, the image capturing device may be calibrated and distortion coefficients may be determined to facilitate image clarity.

At block 230, feature detection may be performed on the pair of images. In these and other embodiments, any of a variety and/or combination of feature detection techniques may be used. For example, Oriented FAST (Features from Accelerated Segment Test) and Rotated BRIEF (Binary Robust Independent Elementary Features) (ORB) may be used. In an ORB feature detection, key points are first identified using FAST. A Harris corner is applied to the top N points identified by FAST. The FAST approach does not identify orientation and rotation, instead identifying the intensity weighted centroid of the patch with the located corner at the center of the patch. Orientation of the patch may be determined based on the vector from the Harris corner to the centroid. Using ORB, a rotation matrix may be computed using the orientation of the patch. BRIEF descriptors may be steered according to the orientation of the patch.

In some embodiments, the feature detection may identify the features in the image $I_t$ and may track the features into the image $I_{t+1}$. For example, a Kanade-Lucas-Tomasi (KLT) feature tracker may be used to track features. Such an approach may utilize a pixel-wise correspondence. The KLT algorithm may assume that a corresponding point may be in the nearby space and may use image gradients to find a best possible motion of the feature point between the original location and the new location.

In some embodiments, the block 230 may include determining if a sufficient number of feature points are trackable. For example, if the number of feature points tracked from one image to another fall below a threshold, a new feature detection may be triggered. For example, using the ORB approach a series of features may be identified and tracked between series of successive images without triggering additional feature detection using ORB. During the process of tracking features between successive images (which may proceed for five, ten, fifteen, or more pairs of images), if at some point the number of feature points/pixels that are trackable between images drops below a threshold, a new feature identification may be triggered. In some embodiments, the threshold number of pixels may include 1000, 1500, 2000, 2500, 3000, 4000, or 5000 pixels. The threshold number may vary based on the resolution of the images used for tracking At block 240, the essential matrix may be computed. The essential matrix (E) may represent the matrix of information describing how a point is transitioned from one image into the next image. The essential matrix be described as:

$$y_1^T E y_2 = 0$$

where $y_1$ and $y_2$ represent homogenous normalized image coordinates. The Nister algorithm may be used to solve a number of non-linear equations to solve for E, and utilizes five points to solve for E as five degrees of freedom are assumed. However, because the feature detection and tracing of the block 230 is imperfect, a series of captures may be taken. For example, a random sample consensus (RANSAC) algorithm may be used. Using RANSAC, at each iteration, a set of five points and their correspondences may be used to solve for E. The algorithm may be repeated for a fixed number of iterations and/or until a threshold number of consistent E has been solved for. After the iterations have completed, the essential matrix with which the highest number of agree may be selected as the essential matrix.

At block 250, the rotation matrix (R) and translation vector (t) may be derived from the essential matrix E. For example, the essential matrix may be represented as:

$$E = R[t]_x$$

where R represents a rotation matrix and $[t]_x$ represents the matrix representation of the cross product with t, and t includes a three-dimensional translation vector. Using the singular value decomposition (SVD) of E, and based on constraints of the rotation matrix R, the following equations may be derived:

$$E = U \Sigma V^T$$

$$[t]_x = V W \Sigma V^T$$

$$R = U W^{-1} V^T$$

where U, $\Sigma$, and V are the matrices of the decomposition of E using the SVD, and W represents a matrix of the form $$\begin{bmatrix} 0 & -1 & 0 \\ 1 & 0 & 0 \\ 0 & 0 & 1 \end{bmatrix}.$$

At block 260, the translation vector (t) and the rotation matrix (R) may be concatenated to determine the position of the camera capturing the images at block 210, and thus an associated vehicle using the camera. For example, if the position of the camera is represented by $R_{pos}$ and $t_{pos}$ then the position of the camera may be represented by the equations:

$$R_{pos} = R R_{pos-1}$$

$$t_{pos} = t_{pos-1} t R_{po} = t_{pos-1} R R_{pos-1}$$

where $t_{pos-1}$ represents $t_{pos}$ at a previous point in time and $R_{pos-1}$ represents $R_{pos}$ at a previous point in time.

As used in the present disclosure, the terms "user device" or "computing device" or "non-transitory computer readable medium" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing device" may be any computing system as previously defined in the present disclosure, or any module or combination of modules running on a computing device.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, and/or others) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modules running on a computing system.

What is claimed is:

1. An autonomous vehicle (AV) comprising:
   an inertial measurement unit (IMU) configured to obtain an angular rate and longitudinal acceleration of the AV;
   a global positioning system (GPS) unit configured to obtain a latitude and longitude of the AV;
   a visual odometry module configured to obtain a first and a second image; and
   a processor configured to perform operations, the operations comprising:
      determine whether the AV operates in an environment designated as flat;
      receive the first and second images;
      responsive to determining that the AV operates in the environment designated as flat, perform processing on the first and the second images to determine a rotation matrix indicative of an amount of rotation between the first and the second images and a translation vector indicating an amount of movement between the first and the second images to estimate a first current state of the AV using a planar model that includes two degrees of freedom in two directions of a plane and one degree of freedom representing an orientation of the AV;
      receive the angular rate, the longitudinal acceleration, the latitude, and the longitude of the AV;
      process, utilizing an extended Kalman filter, the angular rate, the longitudinal acceleration, the latitude, and the longitude of the AV to estimate a second current state of the AV; and
      derive a final current state based on the first current state and the second current state.

2. The AV of claim 1, wherein the IMU comprises at least one of a gyroscope, an accelerometer, or a magnetometer.

3. The AV of claim 1, wherein the visual odometry module comprises at least one of: a camera or an optical sensor.

4. The AV of claim 1, wherein the first and second images comprise gray scale images.

5. The AV of claim 1, wherein performing processing on the first image and the second image to determine the rotation matrix comprises performing feature identification comprising:
   identifying a feature included in the first image;

identifying the feature included in the second image;
determining a difference in a first location corresponding to the feature in the first image and a second location corresponding to the feature in the second image; and
determining a change in location or rotation of the AV based on the difference in the first location and the second location.

6. The AV of claim 5, wherein the feature includes at least one of: a landmark, a street sign, a building, or a gutter.

7. The AV of claim 5, wherein identifying the feature comprises:
determining a threshold number of pixels to be tracked between the first image and the second image;
identifying a first plurality of pixels included in the first image and the second image; and
identifying a second plurality of pixels responsive to determining a number of pixels included in the first plurality of pixels is less than the threshold number of pixels.

8. The AV of claim 1, further comprising:
determining a concatenated matrix including the rotation matrix and the translation vector;
determining a position of the visual odometry module based on the concatenated matrix; and
determining a position of the AV based on the position of the visual odometry module.

9. The AV of claim 1, wherein the processer is further configured to:
determine that the AV has moved to a second environment, the second environment including an amount of vertical change in terrain beyond a threshold; and
based on the AV moving to the second environment, transition from using the planar model to using a three dimensional model with six degrees of freedom in three-dimensional space.

10. A method of autonomous vehicle (AV) localization, the method comprising:
determining whether the AV operates in an environment designated as flat receiving a first and second images;
responsive to determining that the AV operates in the environment designated as flat, performing processing on the first and the second images to determine a rotation matrix indicative of an amount of rotation between the first and the second images and a translation vector indicating an amount of movement between the first and the second images to estimate a first current state of the AV using a planar model that includes two degrees of freedom in two directions of a plane and one degree of freedom representing an orientation of the AV;
receiving an angular rate, a longitudinal acceleration, a latitude, and a longitude of the AV;
processing, utilizing an extended Kalman filter, the angular rate, the longitudinal acceleration, the latitude, and the longitude of the AV to estimate a second current state of the AV;
deriving a final current state based on the first current state and the second current state; and
providing, to the AV, directions for operation of the AV based on the final current state, the first current state, and the second current state.

11. The method of claim 10, wherein the first and second images comprise gray scale images.

12. The method of claim 10, wherein performing processing on the first image and the second image to determine the rotation matrix comprises performing feature identification comprising:
identifying a feature included in the first image;
identifying the feature included in the second image;
determining a difference in a first location corresponding to the feature in the first image and a second location corresponding to the feature in the second image; and
determining a change in location or rotation of the AV based on the difference in the first location and the second location.

13. The method of claim 12, wherein the feature includes at least one of: a landmark, a street sign, a building, or a gutter.

14. The method of claim 12, wherein identifying the feature comprises:
determining a threshold number of pixels to be tracked between the first image and the second image;
identifying a first plurality of pixels included in the first image and the second image; and
identifying a second plurality of pixels responsive to determining a number of pixels included in the first plurality of pixels is less than the threshold number of pixels.

15. The method of claim 10, further comprising:
determining a concatenated matrix including the rotation matrix and the translation vector;
determining a position of a visual odometry module based on the concatenated matrix; and
determining a position of the AV based on the position of the visual odometry module.

16. One or more non-transitory computer-readable storage media configured to store instructions that, in response to being executed, cause a system to perform operations, the operations comprising:
determining whether an autonomous vehicle (AV) operates in an environment designated as flat:
receiving a first and second images;
responsive to determining that the AV operates in the environment designated as flat, performing processing on the first and the second images to determine a rotation matrix indicative of an amount of rotation between the first and the second images and a translation vector indicating an amount of movement between the first and the second images based on an to estimate a first current state of the AV using a planar model that includes two degrees of freedom in two directions of a plane and one degree of freedom representing an orientation of the AV;
receiving an angular rate, a longitudinal acceleration, a latitude, and a longitude of the AV;
processing, utilizing an extended Kalman filter, the angular rate, the longitudinal acceleration, the latitude, and the longitude of the AV to estimate a second current state of the AV;
deriving a final current state based on the first current state and the second current state; and
providing, to the AV, directions for operation of the AV based on the final current state, the first current state, and the second current state.

17. The one or more non-transitory computer-readable storage media of claim 16, wherein the first and second images comprise gray scale images.

18. The one or more non-transitory computer-readable storage media of claim 16, wherein performing processing on the first image and the second image to determine the rotation matrix comprises performing feature identification comprising:
identifying a feature included in the first image;
identifying the feature included in the second image;

determining a difference in a first location corresponding to the feature in the first image and a second location corresponding to the feature in the second image; and determining a change in location or rotation of the AV based on the difference in the first location and the second location.

19. The one or more non-transitory computer-readable storage media of claim 18, wherein identifying the feature comprises:

determining a threshold number of pixels to be tracked between the first image and the second image;

identifying a first plurality of pixels included in the first image and the second image; and identifying a second plurality of pixels responsive to determining a number of pixels included in the first plurality of pixels is less than the threshold number of pixels.

20. The one or more non-transitory computer-readable storage media of claim 16, further comprising:

determining a concatenated matrix including the rotation matrix and the translation vector;

determining a position of a visual odometry module based on the concatenated matrix; and determining a position of the AV based on the position of the visual odometry module.

* * * * *

UNITED STATES PATENT AND TRADEMARK OFFICE
CERTIFICATE OF CORRECTION

| | |
|---|---|
| PATENT NO. | : 11,372,115 B2 |
| APPLICATION NO. | : 16/422640 |
| DATED | : June 28, 2022 |
| INVENTOR(S) | : Dhivya Sukumar et al. |

It is certified that error appears in the above-identified patent and that said Letters Patent is hereby corrected as shown below:

On the Title Page

In Item (72), in Column 1, insert -- Biao Ma, Menlo Park, CA (US) --, therefore.

Signed and Sealed this
Twenty-eighth Day of February, 2023

Katherine Kelly Vidal
*Director of the United States Patent and Trademark Office*